(12) United States Patent
Nordbruch et al.

(10) Patent No.: US 9,031,713 B2
(45) Date of Patent: May 12, 2015

(54) SAFE OPERATION OF A MOTOR VEHICLE

(71) Applicants: Stefan Nordbruch, Kornwestheim (DE); Armin Koehler, Sachsenheim (DE)

(72) Inventors: Stefan Nordbruch, Kornwestheim (DE); Armin Koehler, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 13/737,056

(22) Filed: Jan. 9, 2013

(65) Prior Publication Data
US 2013/0179006 A1 Jul. 11, 2013

(30) Foreign Application Priority Data
Jan. 9, 2012 (DE) .......... 10 2012 200 184

(51) Int. Cl.
*G05D 1/00* (2006.01)
*G06F 17/00* (2006.01)
*B60W 50/029* (2012.01)
*B60W 50/00* (2006.01)

(52) U.S. Cl.
CPC ............ *G06F 17/00* (2013.01); *B60W 50/029* (2013.01); *B60W 2050/0077* (2013.01); *B60W 2050/0295* (2013.01)

(58) Field of Classification Search
CPC ....... G06F 17/00; G07C 5/008; G05D 1/0011
USPC ........................................ 701/2, 43
See application file for complete search history.

(56) References Cited

U.S. PATENT DOCUMENTS

2008/0065294 A1* 3/2008 Katrak et al. ............... 701/43
2010/0250023 A1* 9/2010 Gudat .............................. 701/2

* cited by examiner

*Primary Examiner* — Thomas G Black
*Assistant Examiner* — Luke Huynh
(74) *Attorney, Agent, or Firm* — Kenyon & Kenyon LLP

(57) ABSTRACT

A method for operating a motor vehicle from a plurality of motor vehicles includes the steps of determining, by a central point, that a systematic malfunction is present in a plurality of motor vehicles; providing a communication link between the central point and the motor vehicle; and putting at least one electronic control unit of the motor vehicle into a safe operating mode to ensure the operational safety of the motor vehicle.

12 Claims, 2 Drawing Sheets

SAFE OPERATION OF A MOTOR VEHICLE

CROSS REFERENCE

The present application claims the benefit under 35 U.S.C. §119 of German Patent Application No. DE 102012200184.0 filed on Jan. 9, 2012, which is expressly incorporated herein by reference in its entirety.

FIELD

The present invention relates to a method and a device for safely operating a motor vehicle. In particular, the present invention relates to a method for controlling an electronic control unit on board a motor vehicle and the electronic control unit.

BACKGROUND INFORMATION

In a motor vehicle, multiple electronic control units (ECUs) are installed and interconnected. For the connections, point-to-point connections or bus connections may be used. The electronic control units exchange messages among one another to jointly provide an improved function. For example, two electronic control units may be provided in the form of an anti-lock braking system and a navigation system, the speed of the motor vehicle being determined by the anti-lock braking system and subsequently made available to the navigation system in order to make it possible for the latter to have an improved destination guidance on a predetermined route.

If there is an error in one of the electronic control units, the other electronic control units may thus also be limited in their operation. In this case, more problems often ensue if the first electronic control unit makes available erroneous information than if the information fails to appear entirely. If the first electronic control unit determines an error in its own function which cannot be remedied, it may put itself into a safe operating mode in which it fulfills the functions assigned to it at least partially. In the case of an engine control unit, an emergency operation may be possible in this way at a low vehicle speed, for example.

The other electronic control units may respond to that by also putting themselves into safe operating modes in which they each fulfill their tasks at a lower failure risk, but only partially, if necessary. For this purpose, a data bus which interconnects the electronic control units may be subdivided into subnetworks, thus allowing electronic control units which are not fully functional to be disconnected from the others.

This mode of operation is, however, limited to errors which occur during ongoing operation of the motor vehicle and may be recognized by the electronic control units themselves or mutually. An object of the present invention is to provide a method and a device for proactively remedying a malfunction of an electronic control unit on board a motor vehicle.

SUMMARY

A method according to the present invention for operating a motor vehicle from a plurality of motor vehicles includes the steps of determining, by a central point, that a systematic malfunction is present in a plurality of motor vehicles; providing a communication link between the central point and the motor vehicle; and putting at least one electronic control unit of the motor vehicle into a safe operating mode to ensure the operational safety of the motor vehicle.

In this way, a malfunction may be remedied or avoided which is present on board the motor vehicle due to the electronic control unit being erroneously programmed, for example. According to the present invention, the motor vehicle may be operated in such a way that the malfunction does not even occur in the first place. The operational safety of the motor vehicle may thus be increased. By frequently using the method appropriately, an entire series of motor vehicles, which include comparable electronic control units, may be operated in the same manner. The general traffic safety may thus be increased. It is possible that the intervals between the maintenance visits for the individual motor vehicles are prolonged.

In one preferred specific embodiment, multiple interconnected electronic control units of a motor vehicle are put into a safe operating mode to ensure a cooperation of the electronic control units. For this purpose, a subnetwork operation of a communication network interconnecting the electronic control units may, in particular, be used. Electronic control units which are not impaired by the malfunction may be disconnected from a defective component in this way. At the same time, the electronic control units which are impaired by the malfunction may be operated in such a way that a subsequent error or subsequent damage may be prevented.

In another variant, the safe operating mode includes a partial limitation of the functionality of the electronic control unit. This may, in particular, be meaningful when the electronic control unit controls a safety function of the motor vehicle, e.g., an anti-lock function of the brakes, which may have a positive effect on the operational safety of the motor vehicle even if its functionality is limited. In spite of maintaining the limited functionality, the occurrence of a malfunction may be avoided.

In one variant, the safe operating mode includes a deactivation of the electronic control unit. This is, in particular, advantageous when the function implemented by the electronic control unit is a comfort function which may also be assumed by a driver of the motor vehicle, e.g., temperature control of the passenger compartment. An operating mode of the motor vehicle or the electronic control unit, which is undefined or incomprehensible to the driver, may thus be avoided.

In one specific embodiment, the electronic control unit is put into the safe operating mode only after it has been determined that the malfunction occurs in the motor vehicle in question. For this purpose, it may, in particular, be determined whether the boundary conditions, under which the malfunction not only potentially but actually occurs, may be fulfilled in the present motor vehicle. If the malfunction is present in the electronic control unit, however, without the possibility of erroneously influencing the components of the motor vehicle in the present motor vehicle, the safe operating mode may be avoided for the electronic control unit. Erroneously or prematurely putting the electronic control unit into the safe operating mode may thus be avoided.

In one specific embodiment, it is checked whether the motor vehicle is at a standstill prior to putting the electronic control unit into the safe operating mode. In one variant, the motor vehicle must also be at a standstill during the above-described check as to whether the malfunction occurs in the present motor vehicle. An undefined operating mode or a situation which is unclear to the driver of the motor vehicle when it comes to operating or driving the motor vehicle may be avoided in this way.

In one specific embodiment, modifications which are carried out in the electronic control unit are transmitted to the central point. In this way, the findings of the modifications in a plurality of motor vehicles may be jointly evaluated. The findings may be used to gain an understanding about later modifications in the electronic control units in motor vehicles, thus preventing unnecessary or erroneous modifications.

An example computer program product includes program code for carrying out the described method when the computer program product is executed on a processing device or is stored on a computer-readable data carrier.

An example electronic control unit according to the present invention on board a motor vehicle from a plurality of motor vehicles includes an interface for a communication link to a central point and is configured to be put into a safe operating mode in order to ensure the operational safety of the motor vehicle after it has been determined by the central point that a systematic malfunction is present in the plurality of motor vehicles.

In particular, the control unit may be configured to also put other electronic control units into a safe operating mode and, if necessary, to subdivide a communication network among the electronic control units into multiple subnetworks in order to separate fully operable electronic control units from only partially operable electronic control units.

Preferably, the central point is fixed in place and the communication link includes a wireless segment. The communication link may be established if needed or timed to the central point to determine whether the systematic malfunction was determined in the plurality of motor vehicles. It is thus possible to carry out the proactive remedy of the malfunction on board the motor vehicle more easily and with a reduced time delay.

BRIEF DESCRIPTION OF THE DRAWINGS

The present invention is now described in greater detail with reference to the figures.

DETAILED DESCRIPTION OF EXAMPLE EMBODIMENTS

Figure 1:
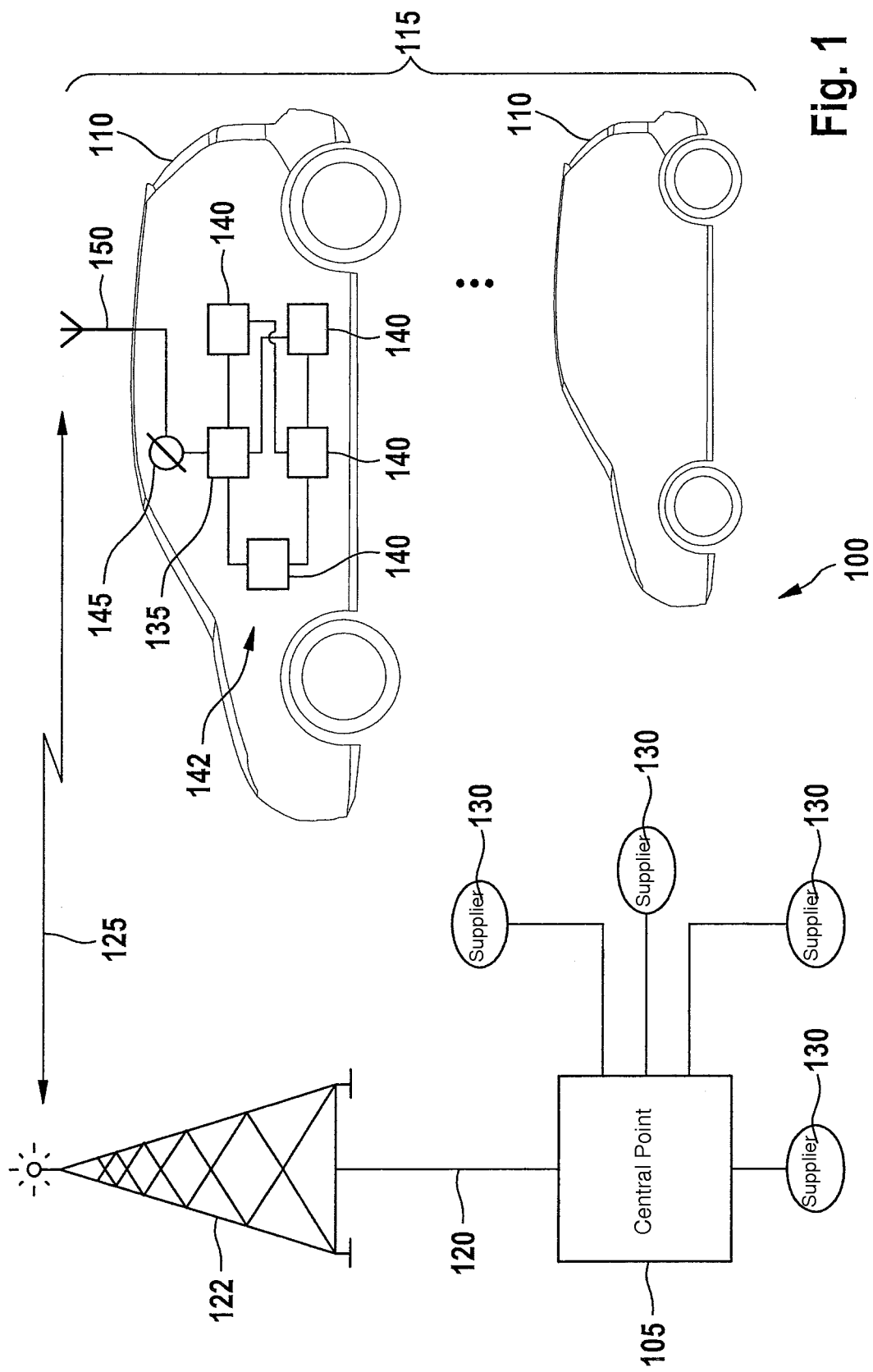
FIG. 1 shows a system for the safe operation of motor vehicles.

FIG. 1 shows a system 100 for the safe operation of motor vehicles. System 100 includes a central point 105 and a motor vehicle 110 which is one of a plurality of identical motor vehicles 115. A communication between central point 105 and motor vehicle 110 takes place with the aid of a fixed communication link 120 to a radio station 122 and from there to motor vehicle 110 with the aid of a wireless communication link 125. Optionally, a number of suppliers 130, each of which is responsible for one or more subsystems on board motor vehicle 110, is connected to central point 105.

Central point 105 may be a data processing system which, in particular, includes a data base for storing data of individual motor vehicles 110 or series 115 of motor vehicles. In the sense of a cloud-based service, the central point may also be provided by a plurality of distributed, interconnected data processing units.

One electronic control unit 135 as well as one or more additional electronic control units 140 are situated on board motor vehicle 110. Control units 135, 140 are interconnected with the aid of a vehicle electrical system 142. The connection may be complete or partial and include point-to-point connections or a data bus. Electronic control unit 135 is equipped with an interface 145 which is connected to an antenna 150. Antenna 150 and radio station 122 represent end points of wireless communication link 125.

Motor vehicles 115 are identical in the sense that they include identical or at least similar electronic control units 135, 140 which fulfill identical or similar functions on board the particular motor vehicle 110. If a systematic malfunction is present in electronic control unit 135 of a first motor vehicle 110, for example, the same malfunction is also present in corresponding electronic control unit 135 of a second motor vehicle since the two electronic control units 135 fulfill corresponding functions which are affected by the systematic error.

On the other hand, the two motor vehicles 110 may differ from one another, for example, with regard to equipment components, level of motorization, activation of functions, or with regard to other electronic control units 140 in such a way that the systematic malfunction does not occur in every one of motor vehicles 110. The malfunction may, for example, be tied to a certain vehicle speed which one of the motor vehicles cannot reach due to its level of motorization.

The systematic malfunction of electronic control unit 135 is characterized in that electronic control unit 135 works just as it was manufactured and, possibly, programmed to work, but it may lead to a function which is not advantageous for fulfilling the original task of electronic control unit 135 or causes an unintentional side effect under predetermined boundary conditions or in the case of certain parameters. Such a malfunction may, for example, include a missing protection against incoherent measuring data, an undefined functionality in the case of a certain operation, e.g., by a driver of one of motor vehicles 110, or a neglected adaptation to a modified behavior of another electronic control unit 140.

In one specific embodiment, suppliers 130 are manufacturers, project managers, or people with influence on the functionality of individual electronic control units 135, 140. For example, same electronic control unit 135, 140 may be manufactured by one supplier 130 and may be installed in motor vehicles 110 of different manufacturers, manufacturer-specific adaptations of the particular control unit 135, 140 being possible under certain circumstances. A systematic malfunction of one of electronic control units 135 may often be determined by supplier 130 and forwarded to central point 105. It is possible for supplier 130 or central point 105 to determine more accurately under what circumstances the malfunction occurs and what motor vehicles 110 belong to the plurality of identical motor vehicles 115 in which the malfunction at least potentially occurs.

Figure 2:
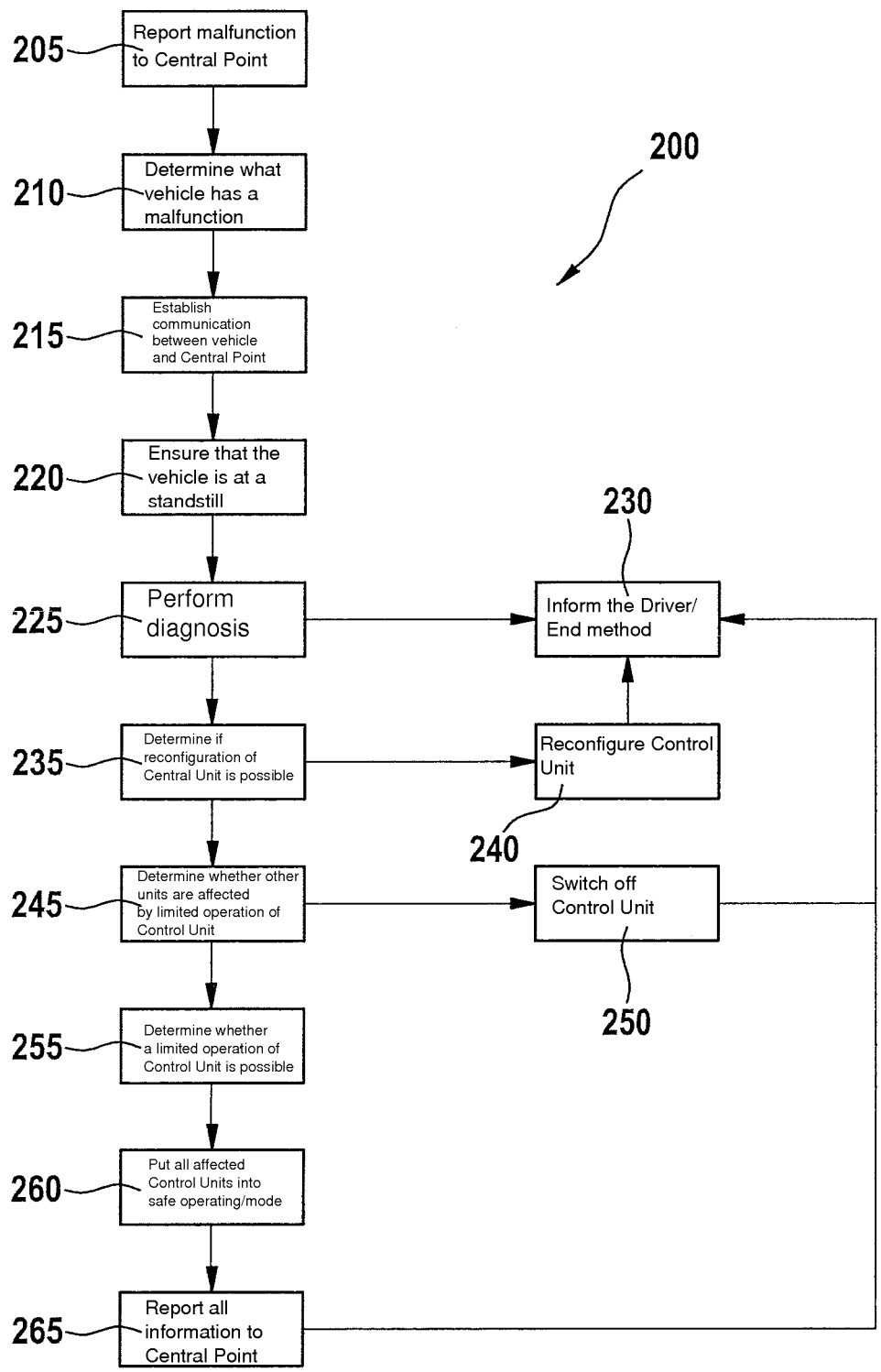
FIG. 2 shows a flow chart of a method for safely operating a motor vehicle.

FIG. 2 shows a flow chart of a method 200 for safely operating motor vehicle 110 from FIG. 1. Method 200 is advantageously carried out on different components of system 100 from FIG. 1. In this case, not all steps of method 200 explained in the following are necessary.

In a first optional step 205, the malfunction is reported to central point 105 by supplier 130. In a step 210, it is subsequently determined either by supplier 130 or by central point 105 what motor vehicles 110 belong to the plurality of identical motor vehicles 115 in which the malfunction may at least potentially occur. Moreover, it may be determined in what way it is to be checked whether or not the malfunction may in fact occur on board a certain individual motor vehicle 110. In one variant of method 200, it may also be determined how it may be accomplished that control unit 135 works error-free using its full range of functions, for example, by installing a software update on one or multiple electronic control units 135, 140. Ideally, the software update is also made available at the same time.

In a step 215, a communication between motor vehicle 110 and central point 105 is subsequently established. The communication preferably takes place with the aid of wireless communication link 125 and, optionally, additionally with the aid of communication link 120 fixed in place, if provided. Wireless communication link 125 may, for example, include a wireless data network such as WLAN, LTE, or another mobile radio technology. Transmission with the aid of the car-to-infrastructure (C2I) communication is also possible. In another specific embodiment, communication link 125 may also include the, preferably wireless, transmission via one or multiple other motor vehicles 110 which is also known as car-to-car (C2C) communication.

Communication link 120, 125 may be established in a timed or event-controlled manner, for example, when starting or parking motor vehicle 110, initiated by one of control units 135, 140 or by a driver of motor vehicle 110.

In an optional step 220, it is ensured that motor vehicle 110 is at a standstill. In addition, a notification may be output to the driver of motor vehicle 110 to stop motor vehicle 110. Method 200 may be interrupted until the standstill of motor vehicle 110 is achieved.

In a subsequent step 225, a diagnosis is preferably carried out to determine whether the malfunction may occur on board affected motor vehicle 110. It is determined in this way whether the malfunction, which is potentially present on board motor vehicle 110, may in fact occur. This diagnosis is preferably based on the findings of supplier 130 or central point 105 which are described above with reference to step 210. The diagnosis may be carried out with the aid of communication link 120, 125 by central point 105 (remote diagnosis) or transmitted, for example, to motor vehicle 110 as an instruction or a sequence of instructions to be carried out there on one of control units 135, 140 (local diagnosis).

If the diagnosis shows that the error cannot occur on board motor vehicle 110, method 200 ends in a step 230, in which a notification is optionally output to the driver of motor vehicle 110 informing the driver of the actions carried out and their results. If necessary, the driver may be prompted to initiate more detailed troubleshooting, for example, within the scope of a repair shop visit.

If, however, it was determined that the malfunction may occur, it is determined in an optional step 235 whether a reconfiguration of control unit 135 is possible. The reconfiguration may, for example, include a modification of control information or the exchange of program parts of electronically programmable control unit 135. For this purpose, the findings obtained by supplier 130 or central point 105 may be used. If the reconfiguration is possible, it is carried out in a subsequent step 240 before method 200 ends in step 230 already described previously.

If a reconfiguration is not possible or provided, it is determined in a step 245 whether a limited operation of control unit 135 is possible. This depends on what type of function electronic control unit 135 carries out and what type of systematic error is present. If a limited operation is not possible or desirable, control unit 135 is switched off in a step 250 before method 200 ends in step 230.

Otherwise, it is determined in a step 255 whether or what additional control units 140 on board motor vehicle 110 are affected by a limited operation of control unit 135. These control units are usually those additional control units 140 which exchange information with malfunctioning control unit 135.

In one specific embodiment, step 220, in which it is ensured that motor vehicle 110 is at a standstill, may be carried out at this time additionally or alternatively to a preceding execution.

In a step 260, all affected control units 135, 140 are put into a safe operating mode. Depending on the present malfunction, a suitable safe operating mode may be selected for every control unit 135, 140. In this case, vehicle electrical system 142 may be subdivided into subnetworks in order to separate, in a suitable manner, control units 135, 140, which continue to function only to a limited extent, from remaining control units 140.

In an optional step 265, the information concerning the steps carried out on board motor vehicle 110 are reported back to central point 105 or supplier 130 with the aid of communication link 120, 125. The information may include the diagnosis result of step 225, the configuration of control units 135, 140 concretely present on board motor vehicle 110, equipment components of motor vehicle 110, the mileage, the parking location, and/or the putting of control units 135, 140 into safe operating modes carried out in step 260. Method 200 subsequently ends in step 230.

What is claimed is:

1. A method for operating a motor vehicle from a plurality of motor vehicles, comprising:
    determining with the aid of a remote central point that a systematic malfunction is present in the plurality of motor vehicles, the systematic malfunction being present if a malfunction is present in the same system of each of the plurality of motor vehicles;
    providing a communication link between the central point and the motor vehicle; and
    putting at least one electronic control unit of the motor vehicle into a safe operating mode to ensure the operational safety of the motor vehicle.

2. The method as recited in claim 1, wherein multiple interconnected electronic control units of the motor vehicle are put into a safe operating mode to ensure cooperation of the electronic control units.

3. The method as recited in claim 1, wherein the safe operating mode includes a partial limitation of a functionality of the electronic control unit.

4. The method as recited in claim 1, wherein the safe operating mode includes a deactivation of the electronic control unit.

5. The method as recited in claim 1, further comprising:
    transmitting modifications, which were carried out in the electronic control unit, to the central point.

6. The method as recited in claim 1, wherein the electronic control unit is put into the safe operating mode only after determining that the malfunction occurs in the motor vehicle in question.

7. The method as recited in claim 1, further comprising:
    checking that the motor vehicle is at a standstill before the electronic control unit is put into the safe operating mode.

8. A method for operating a motor vehicle from a plurality of motor vehicles, comprising:
    determining with the aid of a central point that a systematic malfunction is present in the plurality of motor vehicles;
    providing a communication link between the central point and the motor vehicle; and
    putting at least one electronic control unit of the motor vehicle into a safe operating mode to ensure the operational safety of the motor vehicle, wherein the electronic control unit is put into the safe operating mode only after determining that the malfunction cannot be remedied via the communication link.

9. A non-transitory computer-readable medium storing program code for operating a motor vehicle from a plurality of motor vehicles, the program code, when executed by a processing unit, causing the processing unit to perform the steps of:
- determining with the aid of a remote central point that a systematic malfunction is present in the plurality of motor vehicles, the systematic malfunction being present if a malfunction is present in the same system of each of the plurality of motor vehicles;
- providing a communication link between the central point and the motor vehicle; and
- putting at least one electronic control unit of the motor vehicle into a safe operating mode to ensure the operational safety of the motor vehicle.

10. An electronic control unit on board a motor vehicle from a plurality of motor vehicles, comprising:
- an interface for a communication link to a remote central point, the control unit configured to be put into a safe operating mode to ensure operational safety of the motor vehicle after it has been determined by the central point that a systematic malfunction is present in the plurality of motor vehicles, the systematic malfunction being present if a malfunction is present in the same system of each of the plurality of motor vehicles.

11. The control unit as recited in claim 10, wherein the central point is fixed in place and the communication link includes a wireless segment.

12. A method for operating a motor vehicle from a plurality of motor vehicles, each of the plurality of motor vehicles having at least one corresponding control unit, comprising:
- determining with the aid of a remote central point that a malfunction is present in the at least one corresponding control unit of each of the plurality of motor vehicles;
- providing a communication link between the central point and the motor vehicle; and
- putting the at least one corresponding control unit of the motor vehicle into a safe operating mode to ensure the operational safety of the motor vehicle.

\* \* \* \* \*